United States Patent [19]
Silverbrook

[11] Patent Number: 5,801,716
[45] Date of Patent: Sep. 1, 1998

[54] PIPELINE STRUCTURES FOR FULL-COLOR COMPUTER GRAPHICS

[75] Inventor: Kia Silverbrook, Woollahra, Australia

[73] Assignees: Canon Kabushiki Kaisha, Tokyo, Japan; Canon Information Systems Research Australia Pty. Ltd., North Ryde, Australia

[21] Appl. No.: 744,540

[22] Filed: Aug. 13, 1991

[30] Foreign Application Priority Data

Aug. 16, 1990 [AU] Australia ............... PK1784
Aug. 16, 1990 [AU] Australia ............... PK1785
Nov. 19, 1990 [AU] Australia ............... PK3418

[51] Int. Cl.⁶ .................................. G06F 15/00
[52] U.S. Cl. ..................................... 345/506
[58] Field of Search .......................... 395/162, 163, 395/164, 139; 382/47, 44; 340/731; 345/113, 121, 502, 506

[56] References Cited

U.S. PATENT DOCUMENTS

| | | | |
|---|---|---|---|
| 4,679,038 | 7/1987 | Bantz et al. | 340/721 |
| 4,843,632 | 6/1989 | Lee et al. | 382/56 |
| 4,901,250 | 2/1990 | Ishida | 364/521 |
| 5,241,653 | 8/1993 | Collins et al. | 395/139 |
| 5,357,601 | 10/1994 | Kagawa | 395/135 |
| 5,414,529 | 5/1995 | Terada et al. | 358/448 |
| 5,526,128 | 6/1996 | Fujiki et al. | 358/444 |

FOREIGN PATENT DOCUMENTS

0326137  2/1989  European Pat. Off. .

OTHER PUBLICATIONS

Computer Design, Wilson, "Inmos taken on Image Compression with Discrete Cosine Transform Processor", vol. 28, No. 15, p. 86, Aug. 1989.

International Conference on Acoustics, Speech, and Signal Processing, Shah et al., "A Transform Coding Chip Set for Image Compression" vol. 2, pp. 961–964, Mar. 1990.

Microprocessing and Microprogramming, de Sá et al., "A Parallel Architecture for Real-Time Video Coding" vol. 30, Nos. 1/5, pp. 439–445, Aug. 1990.

Primary Examiner—Phu K. Nguyen
Attorney, Agent, or Firm—Fitzpatrick, Cella, Harper & Scinto

[57] ABSTRACT

A full-color desk top publishinbg (DTP) system is disclosed that includes a general purpose computer system, a full-color high resolution graphics system and peripheral devices such as a color laser copier including a scanner and a printer, a workscreen display and user inputs such as a digitizer and a keyboard. The DTP system can generate graphics images in bands across a page image with the images being stored in DRAM as compressed images using ADCT compession and the JPEG standard. The DTP system includes various pipeline structures which are used in image creation and realization.

62 Claims, 8 Drawing Sheets

BAND1

BAND2

BAND3

BAND4

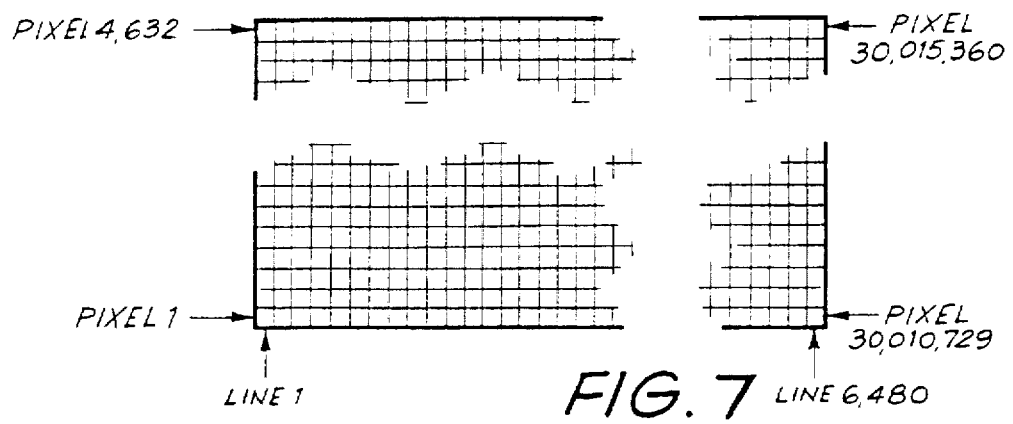
FIG. 7
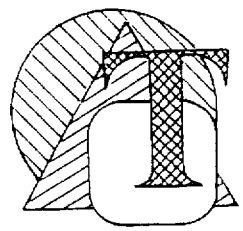
FIG. 8
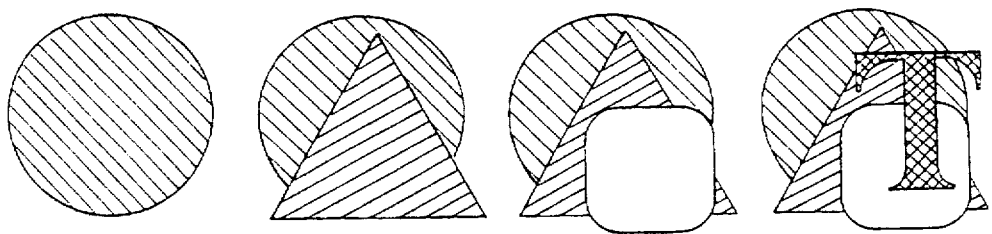
FIG. 9
FIG. 10
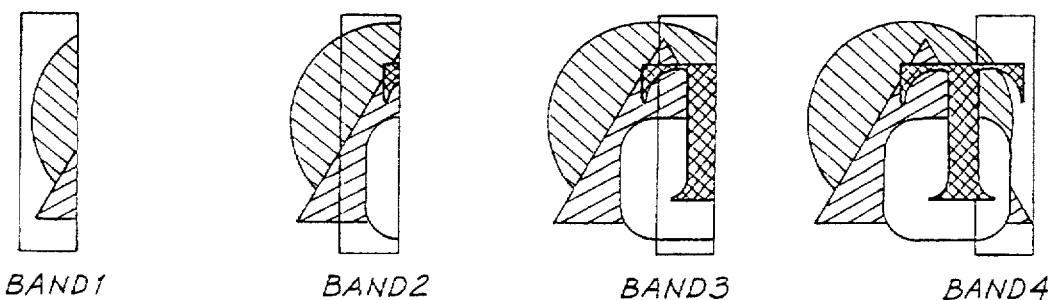
BAND1   BAND2   BAND3   BAND4

PIPELINE STRUCTURES FOR FULL-COLOR COMPUTER GRAPHICS

BACKGROUND OF THE INVENTION

1. Field of the Invention

The present invention relates to full colour desktop publishing (DTP) systems, and in particular, discloses various pipeline structures of such a system that provide for the creation and printing of A3 true colour images at 400 dots per inch.

2. Description of the Related Art

DTP systems such as VENTURA PUBLISHER and PAGEMAKER are well known and provide for document and image creation generally in personal computer systems with the aid of a mouse-like input device and a half-tone laser printer (black on white).

However, there exists a need for DTP systems to operate in full colour and to provide greater versatility for image creation and editing. Full colour DTP systems have been constructed but those known arrangements are expensive when high quality is demanded.

SUMMARY OF THE INVENTION

It is an object of the present invention to substantially overcome, or ameliorate the disadvantages of the prior art through provision of a DTP system that includes pipeline structures that provide enhanced performance at low cost.

In accordance with one aspect of the present invention there is disclosed a pipeline processing system for computer graphics to manipulate compressed image data received from a source or sent to a destination, said system comprising a data source, a data destination, a data compressor/expander to convert image pixel data into compressed image data, and vice versa, and a pixel data manipulator to manipulate said image data in pixel form, said data compressor/expander being located between said data source and said data destination to modify the form of the data passed from said source to said destination, and said manipulator being connected to said compressor/expander to receive therefrom and/or send thereto, only said image pixel data.

In accordance with another aspect of the present invention there is disclosed a pipeline processing system for computer graphics for creating colour page images, said system comprising:

means for rendering bands of pixel image data of an image;

means for compressing the bands and storing compressed image information;

means for expanding the compressed information into bands of pixel information; and means for compositing said bands of pixel information with further bands of rendered pixel image data to vary said image.

In accordance another aspect of the present invention there is disclosed an image system for creating colour page images from a page description language, said system comprising:

computing means for compiling from said page description language a display list of objects of an image to be created;

rendering means for rendering bands of pixel image data of said image from said display list;

compression means for compressing said bands of said image;

storage means for storing compressed bands of said image as compressed band data;

expansion means for expanding said compressed band data into bands of pixel image data; and compositing means for compositing additional rendered bands of pixel image data with existing bands of pixel image data to created edited pixel image data.

Further objects, features and advantages of the present invention will become apparent from the following detailed description of embodiments of the present invention with reference to the accompanying drawings.

BRIEF DESCRIPTION OF THE DRAWINGS

FIG. 7 is a graphical representation of a page image;

FIG. 8 shows a layered graphics image;

FIG. 9 illustrates the formation of the layers of FIG. 8; and

FIG. 10 shows the band rendering of the image of FIG. 8.

DESCRIPTION OF THE PREFERRED EMBODIMENTS

Figure 1:
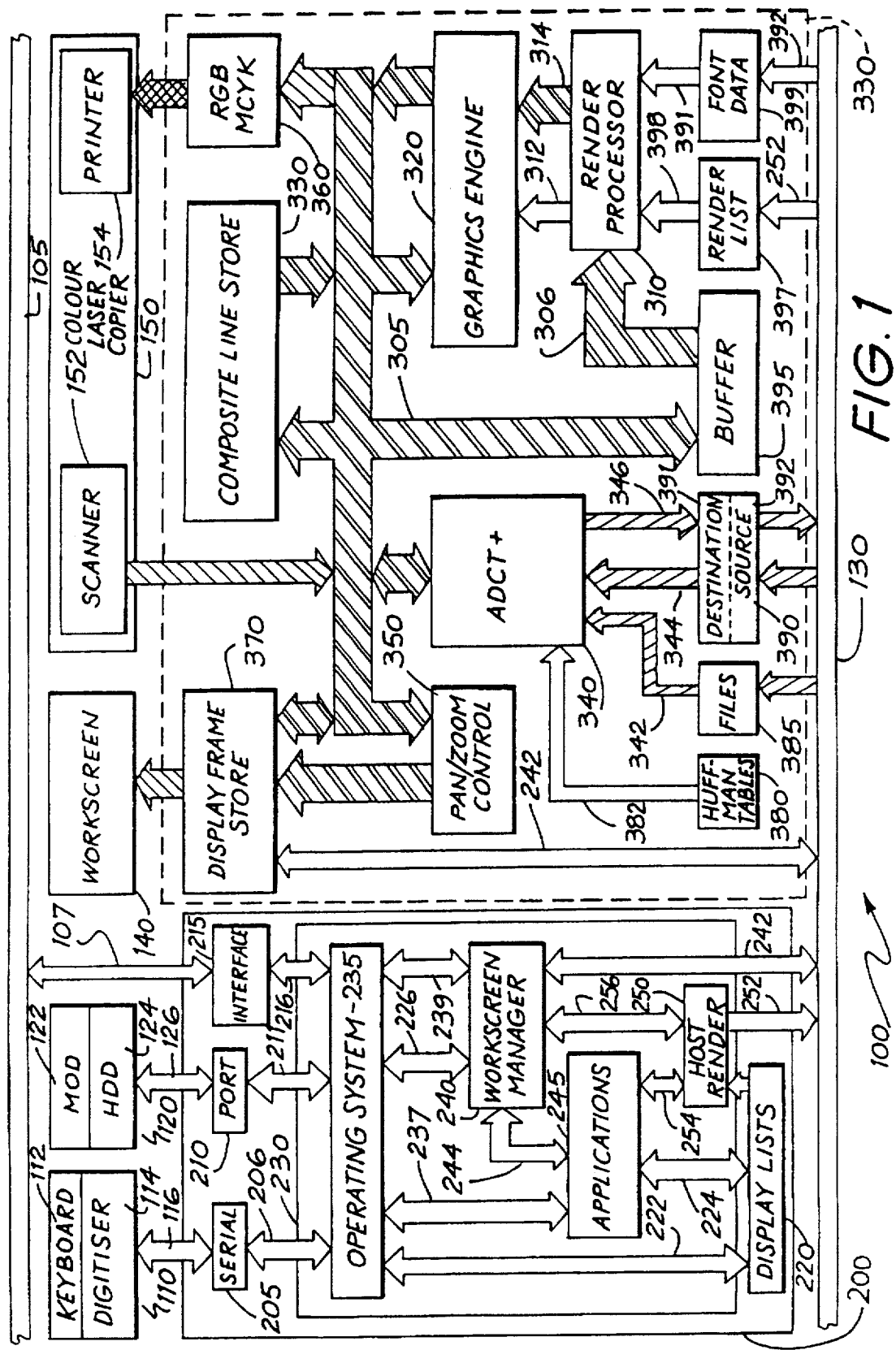
FIG. 1 is a schematic block diagram of a DTP system incorporating the preferred embodiment.

A number of preferred embodiments of the present invention will now be described with reference to the drawings in which:

The primary technique applied herein for achieving the low cost objective is the use of compressed image stores. This allows a page image which would normally require about 100 MBytes to be stored in approximately 4MBytes. A thorough description of the development of, and use of compressed image stores can be obtained from Australian Patent Applcation No. PK1784 of 16 Aug. 1990 and a co-assigned patent application filed on the even date of this application by the present applicant, the disclosure of which is hereby incorporated by cross-reference.

The use of compressed image stores makes the inclusion of multiple image stores in semiconductor memory practical. If compression was not used, an equivalent level of functionality to that described herein would require in the order of 200 MBytes of semiconductor memory. The use of compression means that this can be reduced to around 8 MBytes.

The disclosed arrangement generates graphics for both a page image and a screen image. The screen image is a standard configuration high resolution full colour work-screen which can be either a video display or a liquid crystal display. The video display generally operates at a resolution of 1,280 lines×1,024 pixels, with 32 bits per pixel. The page image is a representation of the printed page. The page image can represent full colour A3 pages at 400 dpi. This results in a resolution of 6,480×4,632 pixels. Colour image handling to resolutions of 1,280×1,024 is now common on desktop publishing systems. However, the implications of image handling at the resolutions required for high quality colour pages may not be as familiar.

The screen image contains 1,310,720 pixels. The page image contains 30,015,360 pixels. When using 32 bits per pixel (8 bits each of red, green, blue and transparency) the image sizes are 5,242,880 bytes and 120,061,440 bytes respectively. The screen image can be built cost effectively using current video memories (VRAMs), however, the cost of the memory required for the page image is currently too high for many DTP applications if built in the conventional manner. For this reason, the disclosed arangement uses image compression for the page image.

Figure 2A:
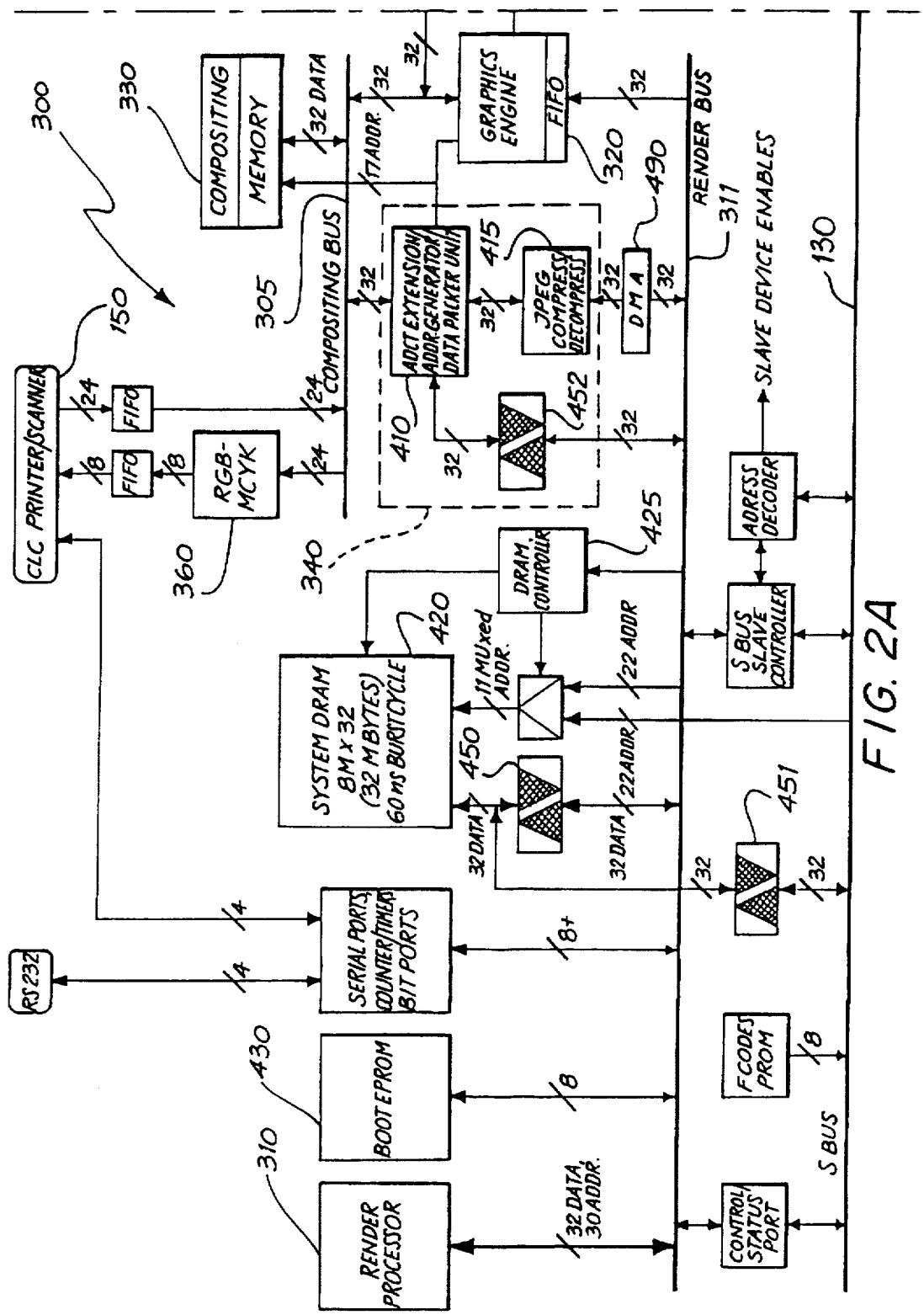
FIG. 2, which is comprised of FIGS. 2A and 2B, is a schematic block diagram of a circuit of a graphics system included in the DTP system of FIG. 1.
Figure 2B:
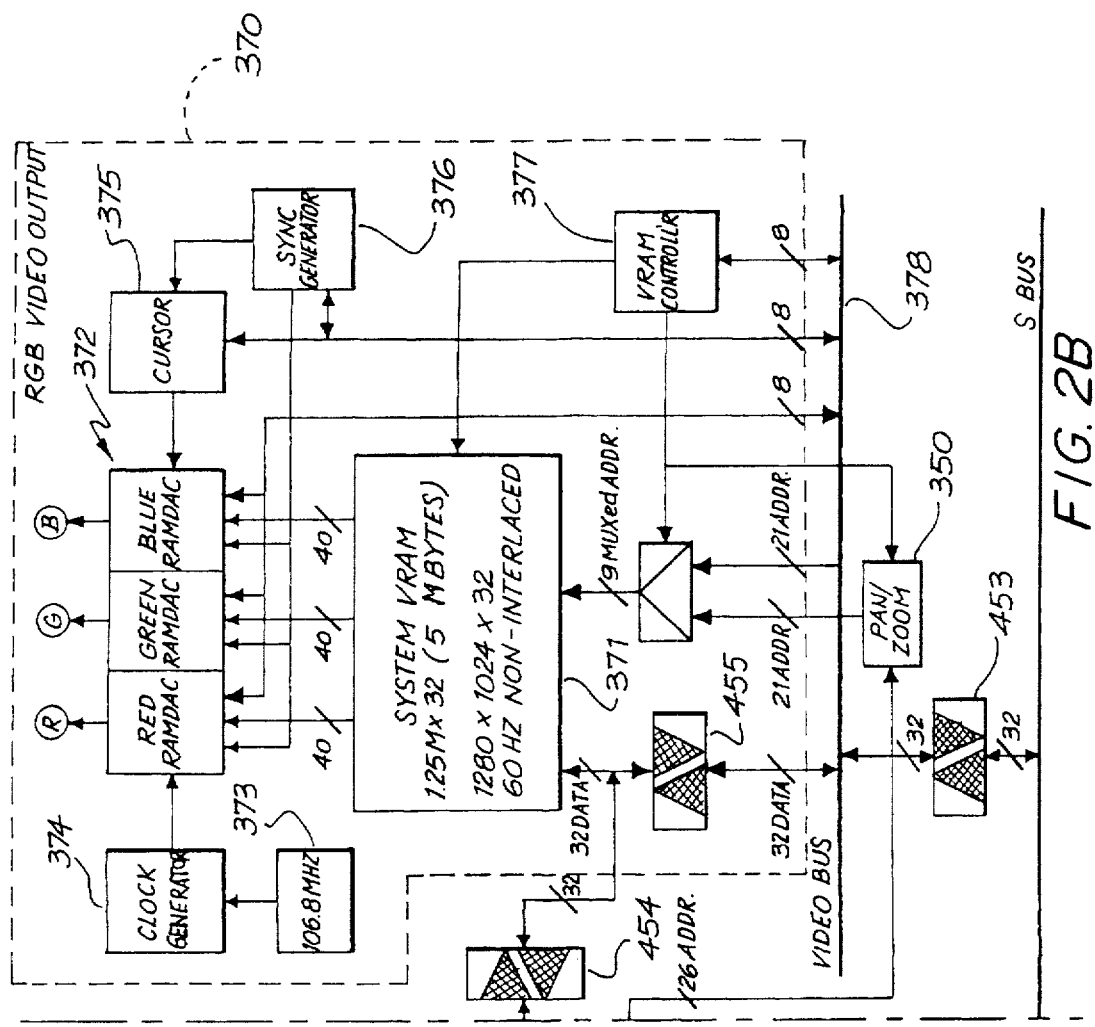

The DTP system 100 of FIGS. 1 and 2 uses a compression system based on the CCITT/ISO JPEG standard for image compression, which can achieve very high image quality at compression ratios of 25:1. However, the use of JPEG compression with colour laser printing processes such as that implemented in the Canon Colour Laser Copier CLC500 results in significant distortion to small point-size text and fine line graphics. For this reason, the DTP system 100 uses a compression system which is largely compatible with the JPEG standard, but preserves black and white text quality. In this specification, this compression system is called ADCT+.

There are two differences between the ADCT+ format disclosed herein and the JPEG standard. Firstly, to permit improvements in the quality of reconstructed text, and array of bits indicating which 8×8 pixel cells are text and which are image is included. There is one bit for each cell (468,990 bits or 58,623 bytes for an A3 page).

Secondly, a special mode of the JPEG standard which includes marker codes at the end of each 8 line block of compressed data is used. This is optional in the JPEG format, but mandatory in the ADCT+ format. This is to allow the C-Cube CL550B JPEG processor device, as seen in FIG. 2, to be switched between expansion and compression modes at 8 line intervals.

While the JPEG standard maintains very high quality, it is not lossless. The differences between an original and a reconstructed image are normally not readily visible for photographic images at a compression ratio of 25:1, though this is not the case for text and line graphics with high frequency content. The ADCT+ technique can restore text quality for text of "binary" colours on "binary" backgrounds, but does not improve text quality over the JPEG system in other cases. The binary colours are those with each of the red, green and blue colour components either fully on or fully off. These are: Black, White, Red, Green, Blue, Cyan, Magenta and Yellow.

The DTP system 100 sometimes uses multiple passes of compression and expansion for compositing. ADCT+ cells (8×8 pixels) where there is no change to the data during compositing will not be further degraded during the second (or subsequent) compression. Where the ADCT+ cell is altered during compositing, there will be a slight further degradation upon compression. This will typically be substantially less than the original degradation.

The DTP system 100 has been configured for high performance, high quality and high functionality at low cost. The illustration of FIG. 1 shows the major functional blocks within the system 100 and basic data flow between the various blocks. Control connections are not shown for the sake of clarity but would be understood by those by skilled in the art.

The DTP system 100 essentially comprises a computer system 200 and a graphics system 300 that are interconnected via a system bus 130. The computer system 200 can be any general purpose computer such as a Sun workstation for example.

The DTP system 100 also has a user interface 110 which includes a keyboard 112 which is used primarily for text entry and a digitizer 114 which acts as a pressure sensitive digitizing tablet for painting, drawing and command entry. The user interface 110 connects via serial connections 116 to a serial port 205, such as an RS232 arrangement, of the computer system 200. The DTP system 100 also includes a disk drive unit 120 which can include a magneto-optical disk drive (MOD) 122 and a standard hard disk drive (HDD) 124. The HDD 124 can be used for storage of standard colour DTP system data. The disk drive unit 120 interfaces to the computer system 200 via a connection 126 to a port 210 such as a Small Computer Systems Interface (SCSI).

The computer system 200 also has an interface device 215 which allows for a connection 107 to be made to a network bus 105 such as an Ethernet.

The computer system 200 includes a general purpose processor 230 such as a 68040 processor manufactured by Motorola. The processor 230 includes various software layers which perform various functions within the DTP system 100. An operating system 235 such as the Unix operating system acts as a software layer which provides system utilities such as multi-tasking kernel, file and I/O management and memory management.

A workscreen manager 240 is a software layer provided for communications and screen management functions. For example, the workscreen manager 240 can include an X-Windows system which is responsible for screen display management, including Windows, Icons, Cursors and Buttons. In the case of "WYSIWYG" images, screen rendering is performed with the system 100 of a render pipeline which takes high level image representations in the form of display lists and converts them to colour pixel data. The workscreen manager 240 can also include the MOTIF system which is a style of user interface useful in DTP applications and in the operation of the DTP system 100.

An applications layer 245 is also provided which implements specific applications necessary for desktop publishing. For example, the applications layer 245 can include a colour Japanese language DTP system as well as graphics applications useful in the system 100. Other applications include English language document creation applications and filters such as a Postcript Level 2 to a Command Interface filter which converts one applications language into the specific command interface language used in the computer system 200. Preferably, the operating system 235 is multi-tasking such that more than one application can be implemented at any time. The applications layer 245 provides for the preparation of a page description language (PDL) of objects used to form a page image. The PDL is compiled to provide a high level representation of the page image as a display list.

A host render layer 250 forms part of the render pipeline. Whenever a new image is to be rendered (created), the host render layer 250 translates display list information from a display list memory 220 into a render list 397 which forms part of the graphics system 300. The host render layer 250 includes steps such as:

(a) calculation of the exact position, size, colour, blend and other characteristics of each text character;

(b) calculation of a spatial sub-division array to increase the speed of any subsequent rendering processes;

(c) calculation of spline outlines for all object based graphics images;

(d) culling objects and graphics which are not to be rendered, for example because they are on a different page of a multiple page document, or where only a portion of a page is to be rendered; and (e) routing of ADCT+ compressed files for expansion.

The display list memory 220 includes high level object based descriptions of coloured documents. The data contained in the display list memory 220 contains floating point object definitions, extending ASCII text definitions, and a ADCT+ compressed pixel images. The display list 220 is optimized for flexibility and ease of interactive modification and is a relatively compact description of any particular image. Pages of graphics and text have data sizes generally less than 10 Kbytes. A single dispaly list can define a multiple page document.

The graphics system 300 as seen in FIG. 1, is structured about a compositing bus 305 which is generally 32 bits wide occupying 8 bits for each of red, green, blue and matte (transparencies) (RGBM) data.

The graphics system 300 includes a render processor 310 which is preferably a high performance 32 bit RISC processor such as the Intel i960CA+ device with high speed DRAM memory interfaces and on-chip data and instruction caches. The render processor 310 also includes DMA channels for reading and writing ADCT+ compressed data to and from storage areas formed in DRAM. The main function of the render processor 310 is to convert render list data 398 into graphics engine commands 312. This process is known as BAND RENDER, and must be performed for each 8 line block of a page image and forms part of the render pipeline.

The render processor 310 outputs RGBM data 314 to a graphics engine 320 which composites runs, blends, bit maps, and other graphics commands into a composite line store 330. The graphics engine 320 is critical to the high performance of the DTP system 100 as it performs pixel and line level operations in hardware. Generally, the graphics engine 320 performs operations at a rate of 13.5 million pixels per second, even where complex transparency and colour blend operations are to be performed for every pixel. The graphics engine 320 is capable of performing many operations at a rate 100 times faster than is presently available in software implementations. A full description of a specific example of the graphics engine 320 can be found in Australian Patent Application No. 80226/91 claiming priority from Australian Patent Application Nos. PK1023 of 5 Jul. 1990 and PK3419 of 19 Nov. 1990 by the same applicant, the disclosure of which is hereby incorporated by cross-reference.

Also connected to the compositing bus 305 is an ADCT+ processor 340 which converts ADCT+ compressed images into pixel data and vice versa in the manner described in Australian Patent Application No. PK1784 entitled "Compressed Image Stores for High Resolution Computer Graphics" of 16 Aug. 1990, the disclosure of which is hereby incorporated by cross-reference. The ADCT+ processor 340 performs adaptive discrete cosine transforms of pixel data to provide compressed images in a manner described in the CCITT/ISO JPEG standard. The ADCT+ processor includes variations to the JPEG standard which permit improvements in the quality of reconstructed text and allows for the insertion of marker codes at the end of each 8 line block of compressed data. Using the ADCT+ processor 340, a full A3 400 dot per inch page image which would normally occupy 98 MBytes of DRAM, can be stored in approximately 4 MBytes of memory in the destination/source location 390 which generally occupies about 12 MBytes of the DRAM 420.

The graphics system 300 includes a number of designated memory locations which are formed in DRAM. Those memory locations provide storage for Huffman tables 380, compressed image files 385, compressed image data 390 having both destination 391 and source 392 partitions, a buffer 395, the render list 397 and font data 399. With reference to FIG. 2, each of these designated memory locations is formed within 32 megabytes of DRAM 420.

The render list 397 is a low level object based description of an image to be shown on a workscreen 140 of the system 300. The render list 397 contains data indicative of individual spline definitions, individual character positions, ADCT+ compressed pixel images, and a spacial subdivision system for speed optimisation. The render list 397 is optimized for speed and is generally large in comparison with the display list 220. Approximately 4 MBytes of memory is allocated for the render list 397. In very complex object based images, more than this amount may be required. In such cases the image must be rendered in several passes.

The font data cache 399 is used to store font data in both outline format and pixel format.

The file store 385 contains an image file in ADCT+ compressed form which is typically an image file to be expanded and composited with the existing source image. The file ADCT+ image may contain more than one compressed image file. It is also forms part of the render pipeline.

The source page image store 392 is a section of the DRAM 420. It forms part of the compositing pipeline. For each compositing pass, data in the source page image store 392 is expanded, composited with the images for the render pipeline, compressed and written into the destination page image store 391 occupying adjacent memory locations in the DRAM 420. As the image source is no longer required when a new image is created, the source page image store 392 is overwritten by the destination page image.

Similarly, the destination page image store 391 stores the ADCT+ compressed page image after compositing. The destination page image of one compositing pass will typically become the source page image for the next compositing pass. The destination page image store 391 is also part of the compositing pipeline.

The image buffer 395 is a section of the DRAM 420 used to temporarily buffer an 8 line block of the page image so that it can be processed by the render processor 310. The types of processing typically performed include formatting into graphics engine commands, and software anti-aliased zoom operations.

The Huffman tables 380 are a section of the DRAM 420 used to store the set-up data for a JPEG compression/decompression device 415, seen in FIG. 2, which forms part of the ADCT+ processor 340. Such a device is the C-Cube CL550B image compression processor. Whenever the JPEG device 415 is changed from compression mode to expansion mode, or vice versa, various tables and registers need to be changed. The largest of these is the Huffman table, but quantization tables and general registers must also be changed. In many instances, the mode of the compression processor 415 is changed as many as 1,620 times during the compositing of a single A3 page. For this reason, the Huffman tables 380 are provided as a separate block of hardware to assist in the rapid change of the processor mode. This hardware consists of a DMA channel and a logic block 490 seen in FIG. 2 which converts the DMA data stream into direct control signals for the JPEG chip 415.

A display frame store 370 connects to the composite bus 305 for the display of graphics images on the workscreen 140. The display frame store 370 is a frame store preferably comprising 1,280 pixels by 1,024 lines with 32 bits per pixel. There are 8 bits for each of red, green, blue and matte planes. The matte plane is not displayed but is used for compositing operations using the graphics engine 320. The display frame store 370 also includes a separate hardware cursor 375, seen in FIG. 2. The display frame store accordingly outputs RGB data to the workscreen 140.

A pan/zoom controller 350 connects to the compositing bus 305 as well as to the display frame store 370 and is used to display a portion of the full page in a window of the workscreen 140. The pan/zoom control unit 350 is capable of integer zoom ratios, such as 1:1, 2:1, 3:1, 4:1, etc. Zoom ratios required to view an entire A3 page on the workscreen is 6:1. Low zoom ratios are useful for close-up views of a portion of a page. The pan/zoom controller 350 is also capable of enlargement of the image for fine detailed work. Enlargements of up to 1:16 are available, resulting in a single page image pixel being written to a 16×16 pixel block of the workscreen 140.

Apart from displaying images on the workscreen 140, the DTP system 100, using a colour laser copier 150, allows for image data to be scanned into the system 100 using a scanner 152 of the copier 150 and printed using a printer 154. The colour laser copier 150 can, for example, be the Canon Colour Laser Copier CLC500 or CLC300, for example. The scanner 152 is capable of scanning an A3 page at 400 dots per inch resolution. The scanner output is in the form of 8 bits for each of red, green, and blue which are buffered simultaneously onto the compositing bus 305. The printer 154 is driven from the compositing bus 305 via a RGB to MCYK converter 360. The converter 360 converts red, green and blue data to magenta, cyan, yellow and black (MCYK) data which is used for the printing process of the printer 154.

The compositing line store 330 is a high speed static memory array which provides 16 lines of page image storage. The compositing line store 330 has four 8 bit planes for red, green, blue and matte. The compositing line store 330 is used in several ways. Firstly, the line store 330 is used as a compositing memory for the page image. In this case, the graphics engine 320 composites 8 lines of object or image data at a time, and the system 300 advances to the next 8 lines of the page image.

Secondly, it is used as a temporary storage buffer for the expanded data of a compressed image file.

Finally, the line store 330 is used as a reordering line buffer for the ADCT+ processor 340. When the DTP system 100 is printing a page, the page image must be expanded synchronously. The compositing line store 330 is used to re-order 8 lines of image data from the 8×8 pixel blocks into 8 lines. All 16 lines of the compositing line store 330 are required in this instance, as the ADCT+ processor 340 must be able to write pixel blocks at the same time as pixel lines are being sent to the printer 154. A similar situation exists for the scanner 152, except in reverse.

The DTP system 100 includes numerous data types that are transferred throughout. Already discussed, are the RGBM type transferred on the compositing bus 305 and RGB data transferred to the converter 360, from the scanner 152, and to workscreen 140.

Also transferred to the display frame store 370 is a synchronous 24 bit RGB pixel data from the workscreen manager 240 via data links 242 and the system bus 130. Such synchronous data is normally used only by the user interface 110 under the control of workscreen manager 240 (such as X-Windows), and is normally written to or read from the workscreen memory formed as VRAM 371 seen in FIG. 2.

Compressed image data is formed by the ADCT+ processor 340, and via the files memory 385 and image memory 390, can be buffered onto the system bus 130. The system bus 130, together with the network bus 105 carry mixed data types and can distribute those data types to peripheral devices connected to the network 105.

Referring now to FIG. 2, a schematic block diagram of the graphics system 300 is shown. The system 300 includes four main busses, one of which is the system bus 130 already described and another of which is the compositing bus 305, also described. A render bus 311 interconnects circuit components associated with image generation and editing. Connected to the render bus 311 is the render processor 310, a boot EPROM 430 which contains low level controlling software, the graphics engine 320 and the ADCT+ processor 340 which includes the JPEG device 415 and the ADCT extension 410. The system DRAM 420 connects via two bus drivers 450 and 451 to the render bus 311 and the system bus 130, respectively. In this manner, data can be buffered into and out of each of the Huffman tables 380, compressed files 385, image storage 390, the buffer 395, the render list 397 and the font data store 399 onto either bus 311 or 130. A logic block 490 is provided for direct memory access (DMA) of the Huffman tables 380 stored in the DRAM 420 to the JPEG chip 415. A bus driver 452 is provided for direct memory access between the compositing memory 330 and the DRAM 420 via the data packer unit 410. A bus driver 452 also allows direct memory access of the JPEG extension data stored in the DRAM 420 to the JPEG chip 415, via the ADCT extension unit 410.

In a similar manner, the display frame store 370 connects to the compositing bus 305 via a bus driver 454. The bus driver 454 supplies a VRAM 371 which is central to the display frame store 370. The VRAM 371 outputs to RAMDAC's 372 for each of red, green and blue which provide video output to the workscreen 140. The display frame store 370 also includes an oscillator 373 which drives a clock generator 374 for the control of the RAMDAC 372. A separate cursor unit 375 is provided for control of the workscreen cursor, particularly in window operations. A sync generator 376, which can be a TMS 34061 device is used to maintain control of the workscreen 140. A video bus 378 is provided which permits interconnection with the compositing bus 305 and the system bus 130. In this manner, workscreen data from a workscreen manager 240 can be buffered directly onto the video bus via a bus driver 453.

Having now described the general configuration of the desktop publishing system 100, specific operations and sequences can be described in greater detail.

The DTP system 100 uses four main systems to create and print images.

These are:

(1) the render pipeline (2) the compositing pipeline (3) the print pipeline, and (4) the scan pipeline

The Render Pipeline

The render pipeline takes high level image representations in the form of display lists and converts them to colour pixel data.

Figure 3:
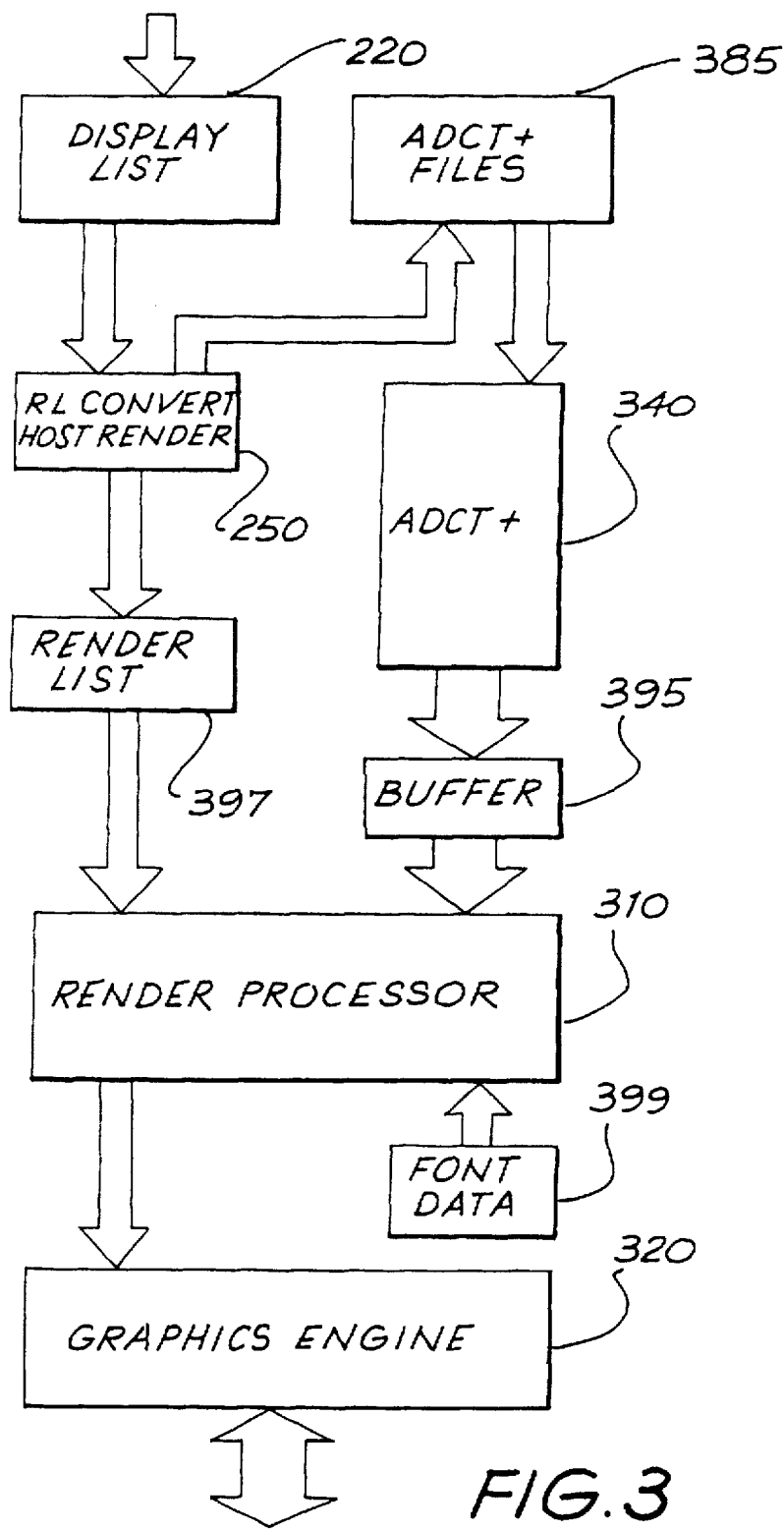
FIG. 3 is a schematic block disgram of a render pipeline of FIGS. 1 and 2.

The render pipeline is the critical section of the DTP system 100 which enables the rapid creation of high quality colour images which combine object graphics, text, and ADCT+ compressed images. The render pipeline is shown in FIG. 3.

The render pipeline for object graphics consists of the following steps:

1. Display List Generation: The display list for an image may be generated locally by the application 245, retrieved from a previously created file (e.g. in disk drives 120), or transferred from another system across the network bus 105.
2. Display list storage: The display list is stored in memory 220 to allow interactive changes, and to allow efficient conversion into the render list 397.
3. Render list conversion takes place in the host render level 250 and converts the high level abstract definition of the image into a low level description that is optimized for speed. The render list conversion process also directs ADCT+ compressed image files 385 to the ADCT+ expander 340. This process occurs once per image.
4. Render list storage: The render list is stored in memory 310 as it must be referenced many times in the rendering of an image.
5. Conversion to graphics commands: The render processor 310 converts the render list 397 into graphics commands 312 for the graphics engine 320. This process occurs once for every 8 line block of an image, so it occurs 810 times for an A3 page.
6. Conversion to pixels: The graphics engine 320 converts the graphics commands 312 to pixel data, and composites this data with the existing pixel data in the image.

Text rendering also makes use of font data that has previously been stored in the font data memory.

The rendering of ADCT+ images uses a different pipeline:

1. Display list generation: The ADCT+ compressed image files are stored and transferred along with the display list.
2. Display list storage: Pointers to the ADCT+ files are kept in the display list.
3. Render list conversion 250 directs the ADCT+ compressed image files 385 to the ADCT+ expansion memory.
4. ADCT+ data storage: The ADCT+ images are stored in the "file" ADCT+ memory 385.
5. ADCT+ expansion: This data is then expanded into RGBM pixels by the file ADCT+ expander 340.
6. Data reformatting: The 8×8 pixel blocks from the ADCT+ converter are stored and formatted into 8 lines of pixel data in the file expansion memory 395.
7. Conversion to graphics commands: The render processor 310 formats the expanded ADCT+ data into graphics commands 312 for the graphics engine 320.
8. Composition with image: The graphics engine 320 composites this data with the existing pixel data in the image.

The Compositing Pipeline

Figure 4:
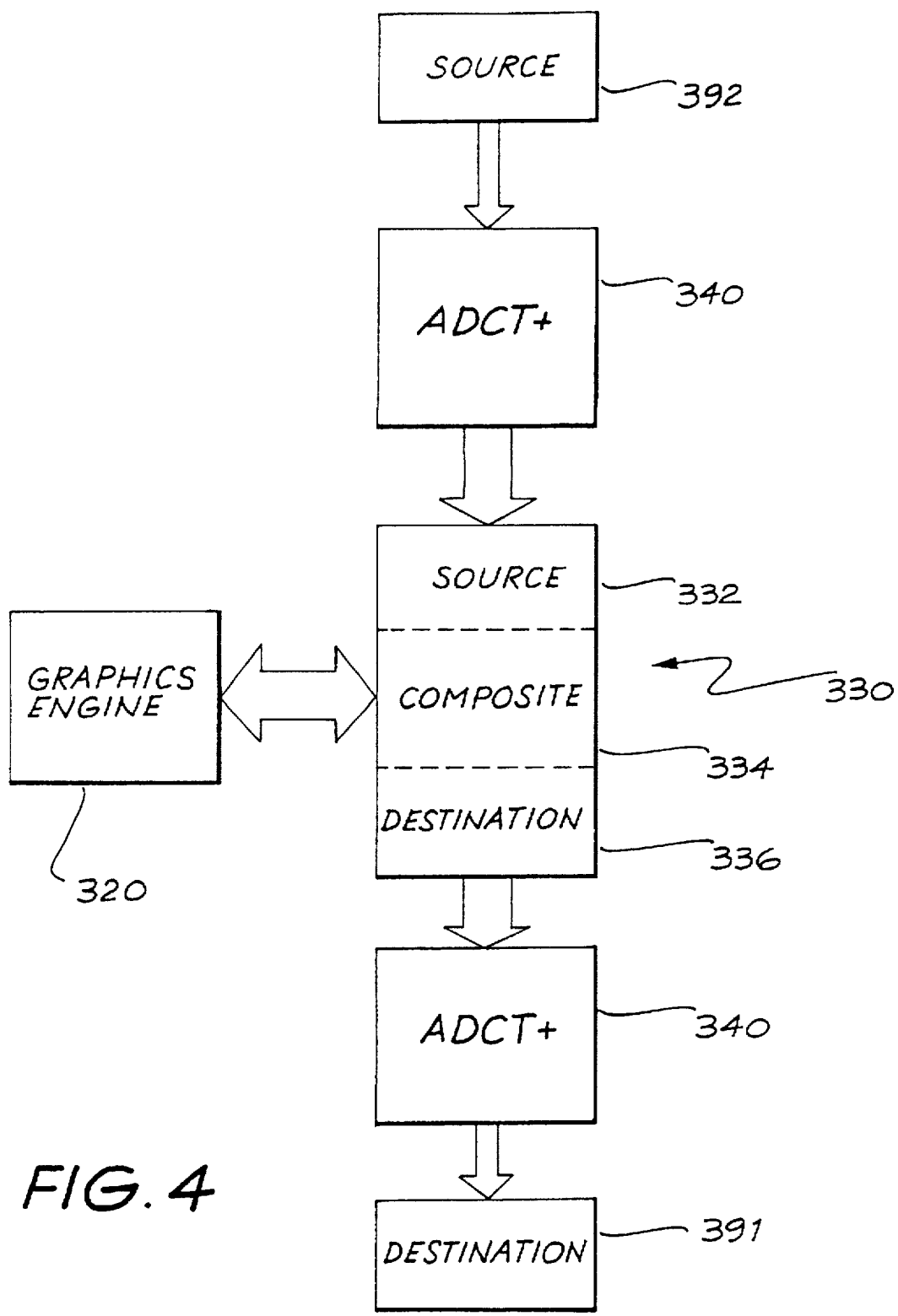
FIG. 4 is a schematic block diagram of a compositing pipeline of FIGS. 1 and 2.

The compositing pipeline, shown in FIG. 4, expands the source ADCT+ image store, composites this with pixel data from the render pipeline or the scanner, and compresses the results as the destination ADCT+ image store.

The compositing pipeline consists of the following images:

1. Source ADCT+ image 392 storage: This is the existing page image with which the new information will be composited. This is stored in ADCT+ format, with typical compression ratio of approximately 25:1, so an A3 page will typically consume approximately 4 MBytes. Each time the Compositing pipeline is used, the source ADCT+ image 392 is replaced with the destination ADCT+ image 391. As the compressed destination image may be larger than the source image, the two images are stored in a "rotating" region of memory: the destination image starts at the end of the source image, but will overwrite the beginning of the source image. The destination image of a compositing pass becomes the source image of the next compositing pass.
2. Source ADCT+ expander 340: This expands 8 lines of the source ADCT+ image 392 and writes them into a source 8 line store 332 of the composite line store 330. This block of 8 lines equals 579 ADCT processing blocks for A3 or A4 sized images.
3. Source 8 line store 332: when the compositing for the previous 8 lines is complete, the source 8 line store 332 is transferred to a compositing 8 line store 334 by switching address banks.
4. Compositing 8 line store 334: This is also part of the compositing line store 330. The graphics engine 320 composites new information with the contents of this memory. When the compositing is complete, the compositing 8 line store 334 is transferred to a destination 8 line store 336 by switching address banks.
5. Graphics engine 320: This device performs the compositing of new image data from the render pipeline or from the scanner 152 with the source image data.
6. Destination 8 line store 336: The 8 lines of destination store 336 are read to be compressed by the destination ADCT+ compressor 340. When the compositing for the next 8 lines is complete, the destination 8 line store 336 is switched with the source 8 line store 332 by switching address banks. This information is then overwritten by the next 8 line source block.
7. Destination ADCT+ compressor 340: This compresses the 8 lines of the destination 8 line store 332 and writes them into the destination ADCT+ image 391.
8. Destination ADCT+ image store 391: This is the new page image being the combination of the source image and the image generated by the render pipeline. The destination ADCT+ image 391 replaces the source ADCT+ image 392 during the rendering and compositing pass, and becomes the new source ADCT+ image for the next rendering and compositing pass.

The Print Pipeline

Figure 5:
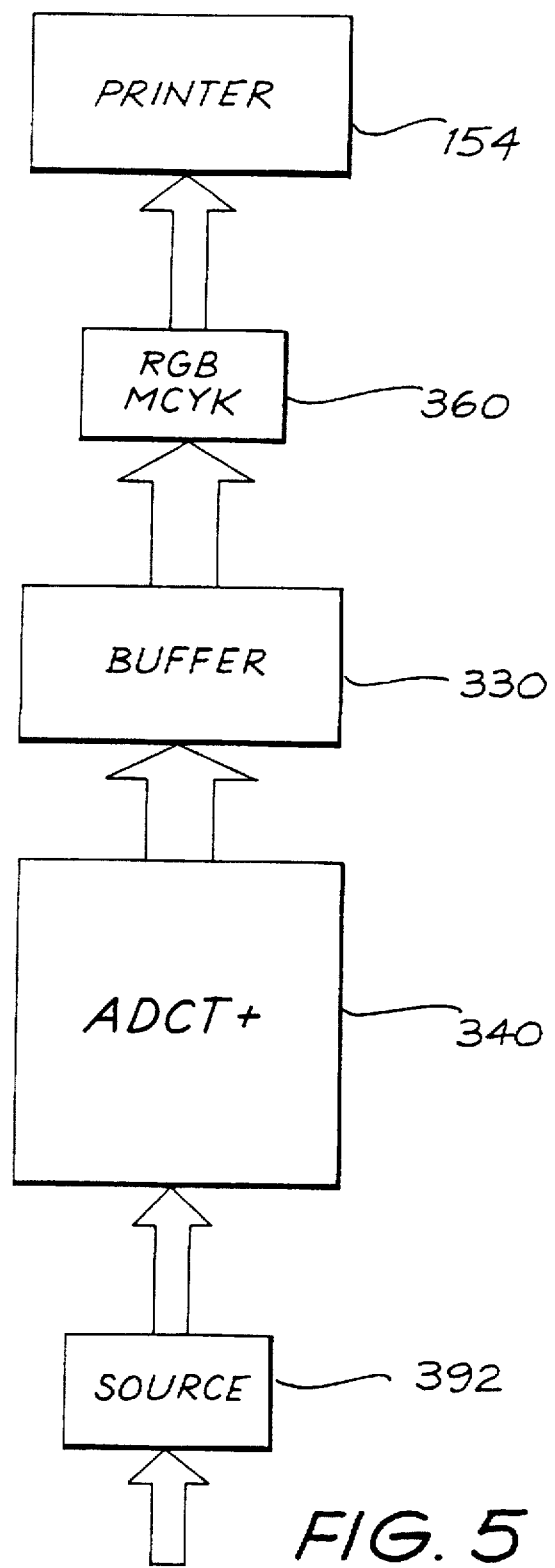
FIG. 5 is a schematic block diagram of a print pipeline of FIGS. 1 and 2.

The print pipeline shown in FIG. 5, expands the source ADCT+ image store into RGB pixel data in real time. The pixels are re-ordered from 8×8 blocks into 8 lines. They are then converted from RGB into C/M/Y/K, and printed. The expansion, conversion and printing process is performed four times for each copy to be printed: once for each of the Cyan, Magenta, Yellow and Black colour printing passes. For the Canon CLC500, data is supplied at 13.35 MBytes per second.

The print pipeline consists of the following stages:

1. Print ADCT+ image storage 392: This is a compressed image of the page ready to be printed.
2. Print ADCT+ expander 340: This expands 8 lines of the print ADCT+ image 392 and writes them into a print expansion memory formed in the composite line store 330. This block of 8 lines equals 579 ADCT processing blocks for A3 or A4 sized images.

3. Print expansion memory 330: This memory reformats the 579 8×8 pixel blocks into 8 lines of pixels.
4. RGB to MCYK converter 360: This converts the Red, Green and Blue colour space used by the DTP system 100, to the four stage sequential Magenta, Cyan, Yellow and Black colour space used by the Canon Colour Laser Printing process.
5. Printer 154: This is the colour laser printer 154 that forms part of the colour copier 150. The printer is capable of printing an A3 size page at 400 dpi resolution. Printer data is in the form of 8 bits each of Magenta, Cyan, Yellow, and Black (MCYK) sent sequentially. The MCYK sequence must be repeated for each copy of each page to be printed.

The Scan Pipeline

Figure 6:
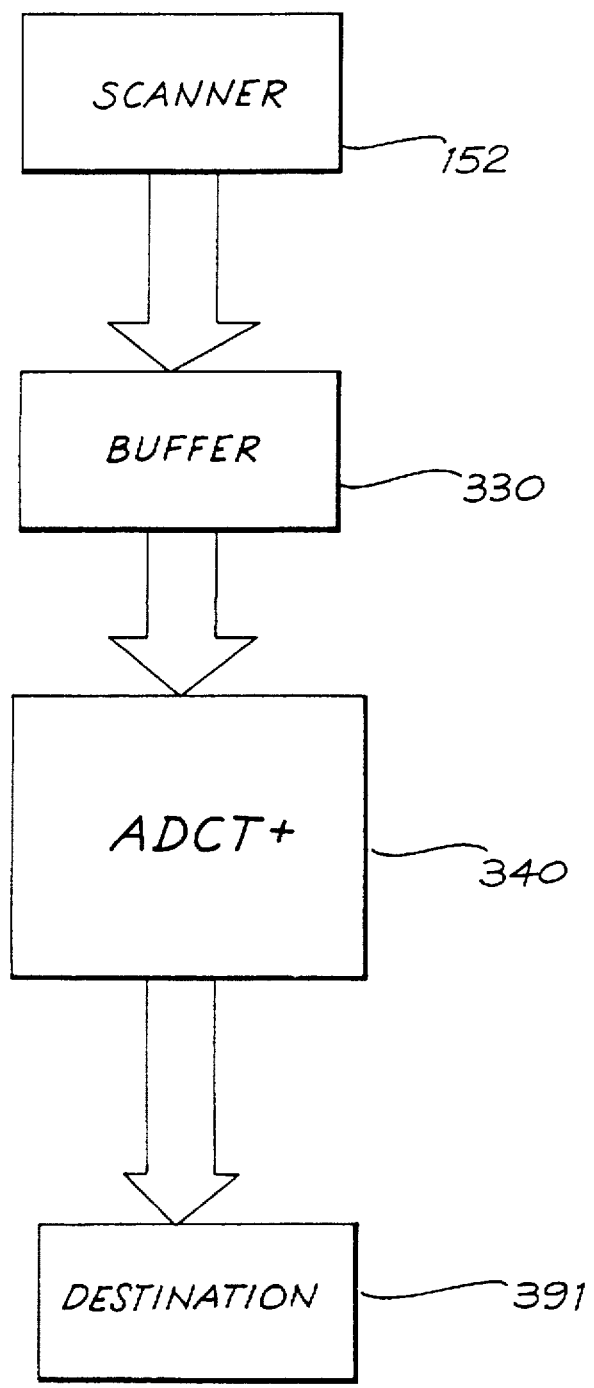
FIG. 6 is a schematic block diagram of a scan pipeline of FIGS. 1 and 2.

The scan pipeline, seen in FIG. 6, accepts the colour data from the scanner 152 and compresses this data to create the destination ADCT+ image 391.

The scanner 152 of the colour laser copier 150 outputs synchronous 24 bit parallel RGB data which is fed to the composite line store 330 which acts as a buffer. The ADCT+ compressor 340 then uses direct memory access (DMA) to compress 8 lines of scanned data at a time. The compressed data is written into the destination ADCT+ image store 391.

Rendering Software Technique

The formation of pixel image data from object based data is known in the art as rendering. As such, rendering opaque images involves writing pixel image data into memory. However, when images are transparent, it is necessary to composite. Compositing involves the combining of pixel images, generally by controlling the proportion of two or more source images in a destination or composited image. Accordingly, rendering transparent images involves compositing newly rendered objects with existing pixel image data.

Using an ADCT+ compressed image store 390 requires that the image must be calculated in essentially the same order as the printer 154 requires the output data for printing. With the Canon colour laser printing process, printing occurs from the bottom left to the top right of an A3 page in landscape mode, as seen in FIG. 7.

This requirement for scan-line ordered image creation is different from the usual method of creating two dimensional object-based graphic images.

Most known systems, including most Postscript interpreters, use the "painters algorithm" which achieves the effect of obscuring underlying objects simply by "writing over" them in a pixel mapped (or bit-mapped for black and white) image store. To create the image shown in FIG. 8, the image is written object by object into the page image store, with each pixel of a new image replacing the pixel already present, in the manner shown in FIG. 9.

This method has the advantage of simplicity in that the image generation process need only consider each object in turn. This simplicity makes the method relatively easy to optimize for speed. Generally, a complete pixel mapped image store is required. For full colour A3 images at 400 dpi, this results in a memory requirement of approximately 96 MBytes per page.

It is possible to create the same image by creating rectangular strips, or bands. This is known as band rendering and is illustrated in FIG. 10. This is useful for systems which do not possess a full page memory, such as some laser printers and dot matrix printers.

Band rendering has the disadvantage of complexity in that all of the objects must be stored, usually in a display list, and the appropriate section of each object must be created for each band. During the process of creating each band, the painters algorithm can be used to overlay the visible objects in that band. This usually is substantially slower than when an entire page store is available, as each object must be created and clipped to each band.

The ADCT+ image compression system used in the DTP system 100 works on blocks of 8×8 pixels. An A4 image with 6,480 lines×4,632 pixels contains 810×579 pixel blocks. The rendering system in the DTP system 100 renders bands of 579 pixel blocks (8 vertical scan lines) in one pass. This rendering process must be repeated for 810 bands to render an entire A3 image.

The requirement to render 810 separate bands for each image places special concerns for speed and efficiency on the image generation process. For example, if an appropriate approach is not taken, image rendering could easily be 100 times slower than with conventional techniques. This problem is solved in the DTP system 100 by a combination of techniques, including the following:

- Conversion of the high level display list 220 into a low level render list 297 optimized for speed. While this process is complex and time consuming, it is only performed once for each image.
- Generation of a spatial subdivision array, so that the render processor 310 automatically "knows" which part of the render list 397 to process for each band.
- Inclusion of vertically scanned bitmapped font data 399 and a high speed format for outline font data.
- Inclusion of a very high speed rendering processor 310.
- Inclusion of special hardware—the graphics engine 320—to speed up colour, bitmap, transparency, and area fill operations by several orders of magnitude.
- Inclusion of high speed image compositing hardware.

The combination of these techniques makes the DTP system 100 operate at very high speed. A3 size images can be created in as little as 6 seconds, and will typically take less than 20 seconds. This means that the DTP system 100 image generation speed is comparable to the Colour Copier print speed under most circumstances.

The order of image creation for the page image is limited by the nature of the image compression method and the image raster format required by the colour laser copier 150. For the Canon CLC500, image creation order must be from left to right of an A3 page in landscape format, or an A4 page in portrait format. Horizontal compositing runs to the 8 line buffer for the page image would be limited to eight pixels long, so only vertical runs are supported. There is no access to individual pixels of the page image without expanding and compressing the entire page.

However, the screen image has no such limitations. The image can be built in any order, and runs can be either vertical or horizontal. Individual pixels can also be addressed in random order. This makes the generation of interactive user interfaces substantially easier.

The foregoing describes only a number of embodiments of the present invention and modifications obvious to those skilled in the art can be made thereto without departing from the scope of the present invention.

What is claimed is:

1. A pipeline processing system for computer graphics to manipulate compressed image data, relating to a displayable image, received from a source or sent to a destination, said system comprising:

a data source;

a data destination;

a data compressor/expander to convert image pixel data into compressed image data, and to convert compressed image data into image pixel data, said data compressor/expander being located between said data source and said data destination to modify the form of data passed from said data source to said data destination; and a pixel data manipulator to manipulate the image pixel data, said manipulator being connected to said compressor/expander to receive therefrom and send thereto, image pixel data, and said manipulator being sized to retain a band of all the image pixel data from which the displayable image is formed, the image pixel data including bitmap data and rendered graphics data, and to permit manipulation of individual ones of the image pixel data, at least one of the bands of the image pixel data being manipulated in turn by said manipulator and then forwarded to said data destination.

2. A system as claimed in claim 1, wherein the image pixel data comprises a predetermined number of bands, each of which comprises a predetermined number of adjacent lines of the image being serially processed from said data source to said data destination in a single pipeline operation by said system.

3. A system as claimed in claim 2, wherein said manipulator is connected between said destination and said compressor/expander to receive image pixel data from said compressor/expander and send manipulated image pixel data to said destination, the output of said compressor/expander being expanded image data received as compressed image data from said source.

4. A system as claimed in claim 3, wherein said destination comprises a data bus and said manipulator comprises a synchronizing buffer to permit said data bus and said compressor/expander to operate at different data rates.

5. A system as claimed in claim 4, wherein a converter which converts RGB image data to MCYK image data is connected to said data bus and said converter outputs to a printer.

6. A system as claimed in claim 2, wherein said manipulator is connected to receive image pixel data from said compressor/expander, manipulate the image pixel data, and send the manipulated pixel data to said compressor/expander.

7. A system as claimed in claim 6, wherein said source and said destination respectively send and receive compressed image data.

8. A system as claimed in claim 7, wherein said source and said destination comprise different address locations of the same memory means.

9. A system as claimed in claim 7, wherein said compressor/expander expands compressed image data from said source for transmission to said manipulator, and compresses image pixel data from said manipulator for transmission to said destination.

10. A system as claimed in claim 9, wherein a memory store adapted to store at least one band of image lines is interposed between said manipulator and said compressor/expander.

11. A system as claimed in claim 9, wherein said manipulator comprises a graphics engine.

12. A system as claimed in claim 2, wherein said manipulator is connected between said source and said compressor/expander to receive image pixel data from said source and send manipulated image pixel data to said compressor/expander, said destination receiving compressed image data from said compressor/expander.

13. A system as claimed in claim 12, wherein said source is a data bus and said manipulator comprises a synchronizing buffer to permit said data bus and said compressor/expander to operate at different data rates.

14. A system as claimed in claim 13, wherein said data bus is connected to an image scanner for providing said image pixel data.

15. A system as claimed in claim 1, wherein said manipulator is connected between said destination and said compressor/expander to receive image pixel data from said compressor/expander and send manipulated image pixel data to said destination, the output of said compressor/expander being expanded image data received as compressed image data from said source.

16. A system as claimed in claim 15, wherein said destination comprises a data bus and said manipulator comprises a synchronizing buffer to permit said data bus and said compressor/expander to operate at different data rates.

17. A system as claimed in claim 16, wherein a converter which converts RGB image data to MCYK image data is connected to said data bus and said converter outputs to a printer.

18. A system as claimed in claim 1, wherein said manipulator is connected to receive image pixel data from said compressor/expander, manipulate the image pixel data, and send the manipulated image pixel data to said compressor/expander.

19. A system as claimed in claim 18, wherein said source and said destination respectively send and receive compressed image data.

20. A system as claimed in claim 19, wherein said source and said destination comprise different address locations of the same memory means.

21. A system as claimed in claim 19, wherein said compressor/expander expands compressed image data from said source for transmission to said manipulator, and compresses image pixel data from said manipulator for transmission to said destination.

22. A system as claimed in claim 21, wherein a memory store adapted to store at least one band of image lines is interposed between said manipulator and said compressor/expander.

23. A system as claimed in claim 21, wherein said manipulator comprises a graphics engine.

24. A system as claimed in claim 1, wherein said manipulator is connected between said source and said compressor/expander to receive image pixel data from said source and send manipulated image pixel data to said compressor/expander, said destination receiving compressed image data from said compressor/expander.

25. A system as claimed in claim 24, wherein said source is a data bus and said manipulator comprises a synchronizing buffer to permit said data bus and said compressor/expander to operate at different data rates.

26. A system as claimed in claim 25, wherein said data bus is connected to an image scanner for providing said image pixel data.

27. A pipeline processing system for computer graphics for creating color page images, said system comprising:

means for creating bands of pixel image data of an image, the pixel image data including bitmap data and rendered graphics data;

means for compressing the bands and storing compressed image information;

means for expanding the compressed information into bands of pixel information; and means for compositing the bands of pixel information with further bands of created pixel image data to vary the image, at least one of the bands of the pixel information being composited by said means for compositing.

28. A system as claimed in claim 27, wherein said means for compressing utilize adaptive discrete cosine transform methods for compressing and expanding image data.

29. An image system for creating color page images from a page description language, said system comprising:

computing means for compiling from the page description language a display list of objects of an image to be created;

creating means for creating bands of pixel image data of the image from the display list, the pixel image data including bitmap data and rendered graphics data;

compression means for compressing the bands of the image;

storage means for storing compressed bands of the image as compressed band data;

expansion means for expanding the compressed band data into bands of pixel image data; and compositing means for compositing additional created bands of pixel image data with existing bands of pixel image data to create edited pixel image data, at least one of the bands of the pixel image data being composited by said compositing means.

30. A system as claimed in claim 29, wherein:

said rendering means comprises a render processor having an input connected to said computing means, for converting said display list objects into pixel image data;

said compositing means comprises a graphics engine and a compositing memory, said graphics engine having a first pixel data input connected to said render processor, a second pixel data input and pixel data output being connected via a compositing bus to said compositing memory; and said compression means and said expansion means are included within a compander, said compander having a first compressed data port connected to said storage means and a second pixel data port connected to said compositing bus, said compositing bus also connecting to said storage means and a pixel data input of said render processor.

31. A system as claimed in claim 30, wherein said compositing bus is adapted to carry red (R), green (G), blue (B) and matte (M) pixel image data.

32. A system as claimed in claim 31, wherein said system maintains an image density equivalent to 400 dots per inch at all stages of image manipulation and storage.

33. A system as claimed in claim 31, further comprising at least one display means connected to said compositing bus and adapted to display bands of pixel image data in concert.

34. A system as claimed in claim 33, wherein said display means comprises a printer configured to display said bands as a page image.

35. A system as claimed in claim 34, wherein said printer is capable of producing page image sizes up to at least International A3 standard.

36. A system as claimed in claim 34, wherein interposed between said printer is a converter for converting red, green and blue pixel image data to magenta, cyan, yellow and black pixel image data for printing by said printer.

37. A system as claimed in claim 33, wherein said display means comprises an electronic display having an associated display memory connected to said compositing bus, for displaying said page image.

38. A system as claimed in claim 37, wherein said electronic display comprises one of a video display and a liquid crystal display.

39. A system as claimed in claim 37, further comprising a pan/zoom device having an input connected to said compositing bus and an output connected to said display memory, wherein said pan/zoom device permits a selectable portion of said page image to be displayed on said electronic display.

40. A system as claimed in claim 37, wherein said computing means has direct access to said display for directly writing pixel data thereto having been generated by said computing means.

41. A system as claimed in claim 31, further comprising an image scanner connected to said compositing bus and adapted to output red, green and blue pixel image data corresponding to a page image scanned thereby.

42. A system as claimed in claim 41, further comprising a printer configured to display said bands as a page image.

43. A system as claimed in claim 42, wherein said scanner and said printer each form part of a color laser copier.

44. A system as claimed in claim 30, wherein said means for compressing utilize adaptive discrete cosine transform methods for compressing and expanding image data.

45. A system as claimed in claim 44, wherein said adaptive discrete cosine transform methods are implemented in accordance with ISO/IEC JTC1/SC2/WG8 JPEG Technical Specifications.

46. A system as claimed in claim 45, wherein Huffman tables required for both compression and expansion are stored in said storage means and are transferred to said compander when compression and expansion operations respectively take place.

47. A system as claimed in claim 45, wherein when said bands of pixel image data are compressed, marker codes are inserted to identify individual bands, said marker codes permitting any one band of a compressed page image to be expanded by said compander and stored in said compositing memory, said one band being input to said second pixel input of said graphics engine which composites said one band with data output from said render processor to create an edited band which is transferred via said pixel data output of said graphics engine to said compositing memory, said edited band thereby being compressible by said compander, and storable in said storage means in concert with other bands of said compressed page image.

48. A system as claimed in claim 45, wherein said compositing memory can store an integral number of bands of said image.

49. A system as claimed in claim 48, wherein said compositing memory can store at least 3 bands of said image.

50. A system as claimed in claim 49, wherein said bands each comprise 8 lines of said page image.

51. A system as claimed in claim 30, wherein said computing means creates from said display list at least one render list including objects to be rendered by said render processor, said render list being transferred from said computing means via a system bus to said storage means, from where said render processor can access said render list.

52. A system as claimed in claim 51, wherein said computing means further provides font data which is stored in said storage means and accessible by said render processor for the generation of text and graphic images.

53. A system as claimed in claim 29, wherein connected to said computing means are user input devices comprising at least one of a keyboard, a digitizing pad, and a mouse.

54. A system as claimed in claim 29, further comprising a non-volatile storage means connected to said computing means from which image data can be transferred from and to said storage means.

55. A system as claimed in claim 29, wherein said computer means further comprises means for connection to a communications network to which data can be transferred.

56. A system as claimed in claim 29, wherein said bands each comprise 8 lines of said page image.

57. A system as claimed in claim 29, wherein said storage means is capable of storing multiple compressed page images.

58. A system as claimed in claim 57, wherein each said compressed page image occupies about 4 MBytes.

59. A system as claimed in claim 58, wherein said storage means is composed of 32 MBytes of DRAM.

60. A system as claimed in claim 29, wherein said pixel image data for a full page image occupies about 96 MBytes which is compressible to about 4 MBytes for retention in said storage means.

61. A processing system for computer graphics to manipulate compressed image data, relating to a displayable image, received from a source or sent to a destination, said system comprising:

a data source;

a data destination;

a data expander to convert compressed image data into image pixel data, said data expander being located between said data source and said data destination to modify the form of data passed from said data source to said data destination; and a pixel data manipulator to manipulate the image pixel data relating to a predetermined portion of the displayable image, said manipulator being connected to said data expander to receive therefrom and send thereto image pixel data, and said manipulator is sized to retain a band of the image pixel data from which the displayable image is formed, the image pixel data including bitmap data and rendered graphics data, and to permit manipulation of individual ones of the image pixel data, at least one of the bands of the image pixel data being manipulated in turn by said manipulator and then forwarded to said data destination.

62. A processing system for computer graphics for creating color page images, said system comprising:

means for creating bands of pixel image data of an image, the image pixel data including bitmap data and rendered graphics data;

means for compressing the bands and storing compressed image information;

means for expanding the compressed information into bands of pixel information; and means for compositing the bands of pixel information with further bands of created pixel image data to vary the image, at least one of the bands of the pixel information being composited by said means for compositing.

* * * * *

UNITED STATES PATENT AND TRADEMARK OFFICE
CERTIFICATE OF CORRECTION

PATENT NO. : 5,801,716

DATED : September 1, 1998

INVENTOR(S) : KIA SILVERBROOK

It is certified that error appears in the above-identified patent and that said Letters Patent is hereby corrected as shown below:

Title page, item
[57] ABSTRACT

Line 1, "is disclosed" should be deleted;
Line 3, "that" should be deleted; and
Line 8, "compession" should read --compression--.

COLUMN 1

Line 56, "another" should read --with another--.

COLUMN 2

Line 20, "disgram" should read --diagram--; and
Line 23, "2." should read --2;--.

COLUMN 3

Line 64, "by" (second occurrence) should be deleted.

COLUMN 6

Line 26, "is" should be deleted.

UNITED STATES PATENT AND TRADEMARK OFFICE
CERTIFICATE OF CORRECTION

PATENT NO. : 5,801,716

DATED : September 1, 1998

INVENTOR(S) : KIA SILVERBROOK

It is certified that error appears in the above-identified patent and that said Letters Patent is hereby corrected as shown below:

COLUMN 16

Line 51, "said" should read --said--.

Signed and Sealed this

Tenth Day of April, 2001

Attest:

NICHOLAS P. GODICI

Attesting Officer  Acting Director of the United States Patent and Trademark Office